United States Patent [19]

Sauer

[11] Patent Number: 5,215,215
[45] Date of Patent: Jun. 1, 1993

[54] METHOD AND APPARATUS FOR INTRODUCING VISCOUS ACTIVE INGREDIENTS INTO THE CASE OF GALVANIC CELL

[75] Inventor: Hans Sauer, Idstein-Walsdorf, Fed. Rep. of Germany

[73] Assignee: Varta Batterie Aktiengesellschaft, Hanover, Fed. Rep. of Germany

[21] Appl. No.: 640,248

[22] Filed: Jan. 11, 1991

[30] Foreign Application Priority Data

Mar. 17, 1990 [DE] Fed. Rep. of Germany ....... 4008705

[51] Int. Cl.⁵ .............................................. B67B 7/00
[52] U.S. Cl. ........................................ 222/1; 222/214; 222/334; 141/114; 251/6; 251/7; 417/476
[58] Field of Search ...................... 222/1, 214, 334, 95, 222/101, 102, 496, 383, 185; 141/114; 417/476, 474; 251/5, 6, 7

[56] References Cited

U.S. PATENT DOCUMENTS

| 2,673,011 | 3/1954 | Rood et al. ...................... 222/214 X |
| 2,993,626 | 7/1961 | Gildersleeve ........................ 222/214 |
| 3,224,647 | 12/1965 | Dietert et al. .................... 222/334 X |
| 3,232,496 | 2/1966 | Rockwell, Jr. et al. ........ 417/476 X |
| 3,881,641 | 5/1975 | Pliml, Jr. et al. .................... 251/6 X |
| 4,529,106 | 7/1985 | Broadfoot et al. ............. 222/214 X |

FOREIGN PATENT DOCUMENTS

| 2434292 | 2/1975 | Fed. Rep. of Germany ...... 417/474 |
| 1076622 | 2/1984 | U.S.S.R. .............................. 417/474 |

Primary Examiner—Gregory L. Huson
Attorney, Agent, or Firm—Weiser & Stapler

[57] ABSTRACT

Viscous active ingredients are introduced into the case of a galvanic cell by extrusion from a nozzle fed with the ingredients by a pumping device. The pumping device includes an elastic, substantially straight piece of hose, and a pressure roll which can be moved along the hose between two established limits, both in the general direction of the outlet nozzle to compress the hose, and in the opposite direction to assume a retracted position along the hose. The piece of hose is compressed at a point immediately adjacent to the hose segment defined between the established limits of the pressure roll so that the material to be metered does not come into contact with parts in relative motion to each other.

11 Claims, 1 Drawing Sheet

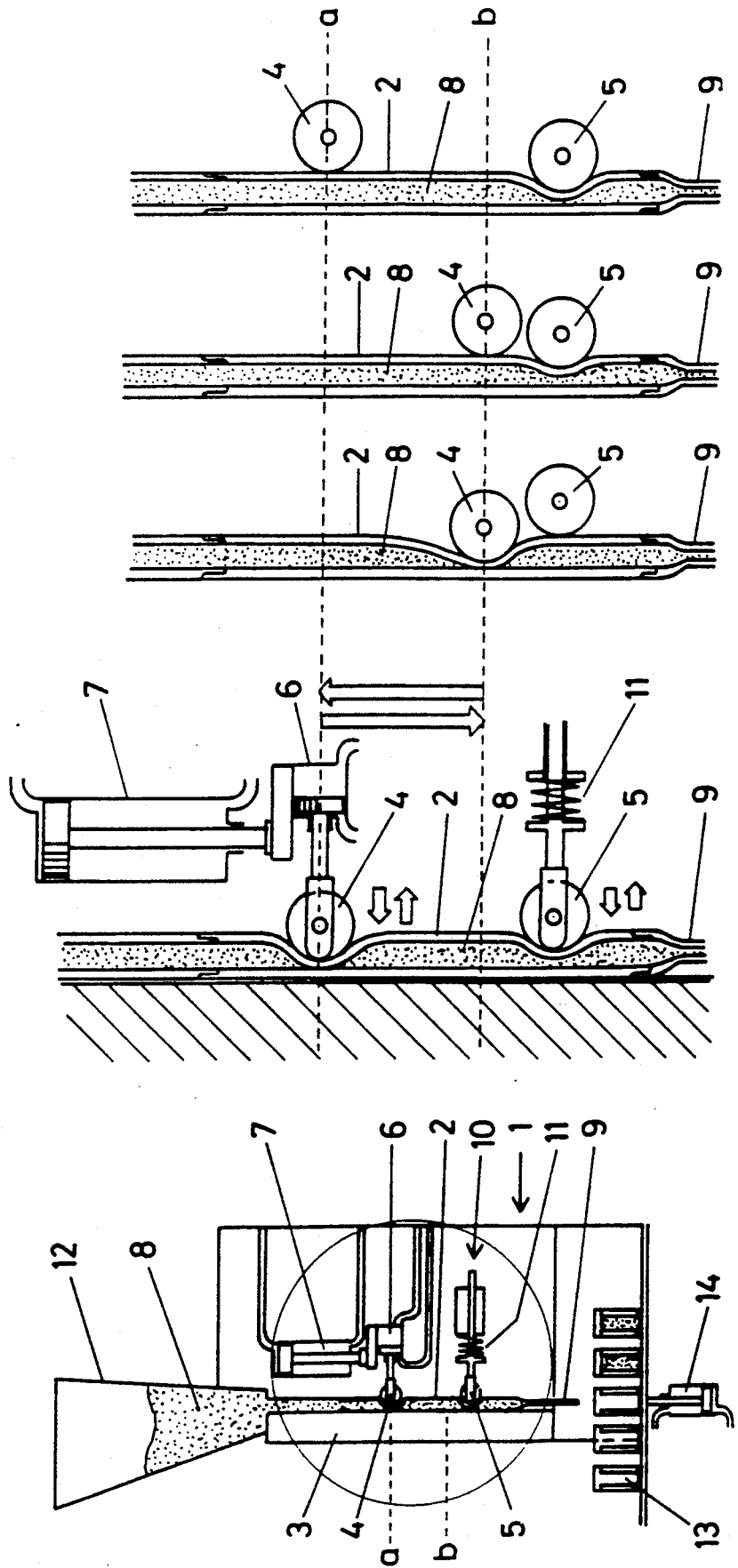

METHOD AND APPARATUS FOR INTRODUCING VISCOUS ACTIVE INGREDIENTS INTO THE CASE OF GALVANIC CELL

BACKGROUND OF THE INVENTION

The present invention generally pertains to filling of the case of a galvanic cell with viscous active ingredients.

In the production of galvanic cells such as round cells and button cells, the means used to precisely fill the cases (i.e., cups or cans) of the cells with active ingredients, including the electrolyte, tend to occupy a great deal of floor space. What is more, this production step is especially labor-intensive, which helps explain the lack of practical alternatives for improving the filling process, thus making it more economical, through the use of machinery adapted to an automated production flow.

Liquid ingredients (electrolyte) can be added by metering pumps, injecting the precise volume of liquid required through hollow needles. Pressing tools (for example, as disclosed in DE-AS 23 26 460) are generally used to fill cells with primarily solid or powdered active materials or depolarizers (e.g., the material is compressed and compacted in the mouthpiece of a metering tool, and is pushed into the cell cup as a plug of material). Still other types of filling devices are used for metering ingredients which, although free-flowing, are primarily gellike in consistency. The present invention is primarily directed toward the dosing of materials of this latter type, including materials such as electrolyte gels or highly viscous zinc pastes used in alkaline round cells or button cells.

To this end, DE-AS 16 71 861 and DE-PS 26 16 732 disclose devices which allow for the simultaneous injection of materials for the positive electrode, the negative electrode and a prethickened electrolyte. For this purpose, the discharge nozzle of the device includes three coaxially arranged hollow mandrels for forming and discharging strands of material. The conveying mechanisms for these devices usually operate responsive to movements of pistons in hollow cylinders. Desired ingredients are delivered to the cylinders through pressure lines fitted with rotary valves for enabling discontinuous feeding. Volumetric metering is accomplished by stops or through regulation of the piston stroke.

However, in practice, it has been found that the metering of zinc powders (particularly those mixed into pastes with alkali hydroxides and gelatinizing agents) by means of piston pumps controlled by rotary valves is inappropriate when low-mercury zinc is used to satisfy stricter environmental regulations. This is because greater frictional resistance with the particles of the zinc material tends to develop within such pastes as compared to zinc powders with a higher mercury content. This increased frictional resistance produces a pressure buildup in the pump casing, ahead of the cross-sectional constriction in the corresponding metering nozzle.

As a result, the solid and liquid in the paste can separate at narrow gaps in the metering device, such as the gaps developed between the rotary disk valve and the valve housing. The liquid is pressed out of the paste, and the solid particles are left behind, which leads to electrolyte depletion and solidification of the paste. This can at times lead to fusion of the zinc particles, resulting finally in a blockage of the rotary disk valve. This effect is particularly prevalent in zinc powders with Hg concentrations under 1%. As a result, conventional piston pumps are often subject to increased wear, o and needed restorations are very expensive due to the need to replace high-grade ceramic parts.

SUMMARY OF THE INVENTION

It is therefore the object of this invention to provide a means for ensuring the reliable and trouble-free conveyance of viscous active materials in a filling procedure.

This and other objects are accomplished in accordance with the present invention by introducing viscous active ingredients into the case of a galvanic cell by extrusion from a nozzle fed with the ingredients by a pumping device comprised of an elastic, substantially straight piece of hose, a pressure roll which can be moved along the hose between two established limits, both in the general direction of the outlet nozzle to compress the hose, and in the opposite direction to assume a retracted position along the hose, and means for compressing the piece of hose at a point immediately adjacent to the hose segment defined between the established limits of the pressure roll. To be noted is that the metering device is basically a hose pump, having the significant advantage that the material to be conveyed does not come into contact with parts in relative motion to each other, where the above-described undesired separating effects could develop.

For further detail regarding a preferred embodiment metering pump according to the present invention, reference is made to the detailed description which is provided below, taken in conjunction with the following illustrations.

BRIEF DESCRIPTION OF THE DRAWINGS

FIG. 1 is a partially sectioned, side elevational view of a metering pump produced in accordance with the present invention.

FIGS. 2A–2D schematically illustrate operation of the metering pump, showing various conditions of the hose at four stages of a working cycle.

In the several views provided, like reference numbers denote similar structure.

DETAILED DESCRIPTION OF A PREFERRED EMBODIMENT

Referring to FIG. 1, the metering device 1 is generally comprised of a rubber hose 2 which rests against a vertical rail 3, and which can be compressed by pressure rolls 4, 5 that can be moved along the hose and the rail, with the rail 3 functioning as a support. The roll 5 is supported in position so as to be movable only in a direction perpendicular to the hose, so that the hose is always compressed in the same place by the roll 5. However, the roll 4 is capable of an additional component of movement, parallel to the hose. The roll 4 is moved in a direction perpendicular to the hose by a working cylinder 6, and in a direction parallel to the hose by a working cylinder 7. Working cylinders 6, 7 are both preferably pneumatically operated.

The roll 4 can thus be moved along the hose 2 responsive to timed coordination of the two working cylinders 6, 7, developing a zone of contact pressure from a position (defining an upper stop) at "a" to a position (defining a lower stop) at "b". The roll 4 is returned to stop a by releasing the pressure within the working cylinder 7, returning the working cylinder 7 to its initial state.

Downward movement of the roll 4 operates to squeeze contents or filler material 8 toward the discharge nozzle 9 in an amount corresponding to the volume of the hose segment defined between the stops a and b.

The roll 5 is mounted within a head such that the hose 2 is squeezed at only one discrete position which is always the same, and which is located just beyond the hose segment a-b which is compressed by the roll 4. The roll 5 can be moved in only one direction, the direction of compression, which is advantageously regulated by a simple tensioning spring 11. Although not shown for purposes of clarity, the roll 5 is also preferably operated by a working cylinder similar to the working cylinder 6 for the roll 4, instead of the spring 11. In this way, movement of the roll 5 can be controlled as a function of time, in the same way as is movement of the roll 4. Although less preferred, the head 10 could, if desired, employ only a rounded fixed edge to accomplish its intended purpose, instead of a roll 5, since this structure does not have to perform a rolling movement along the hose 2.

In practice, the hose 2 communicates with a reservoir 12 for the filler material 8, and the cell cups 13 to be filled are passed beneath the discharge nozzle 9. The cell cups 13 preferably can be raised toward the mouth of the discharge nozzle 9 during the filling procedure, by a working cylinder 14, and then lowered to their original position in a timed cycle. FIGS. 2A-2D further illustrate this filling procedure, showing four discrete positions of the pressure rolls 4, 5 and the hose deformations produced by the rolls 4, 5 during a complete operating cycle. The arrows indicate the magnitude and direction of movement of the rolls 4, 5 between these several operating positions.

For example, referring first to FIG. 2A, in an initial operating position the roll 4 is pressed firmly against the hose 2, ready to commence movement from stop a to stop b. At this point, the roll 5 exerts a slight compressive force on the hose 2, with the spring 11 tending to relax against the restoring force of the elastic hose material. Back pressure due to the filling material 8, produced by the advancing roll 4, will not yet have built up.

Referring next to FIG. 2B, the roll 4 is advanced to the stop b while squeezing the hose 2, so that the quantity of filler material 8 which was present in the hose 2 between the stops a and b when the roll 4 began its advancing movement, is pushed toward the discharge nozzle 9. A corresponding amount of filler material 8 will then emerge from the discharge nozzle 9, filling the cell container 13 positioned under the nozzle 9. Due to the inherent cross-sectional constriction in the transition from the hose 2 to the nozzle 9, the material flow will back up, and the filler material 8 will be compressed at the roll 5, so that the roll 5 will give way to the internal pressure developed within the hose 2, as well as the elastic restoring force of the hose. The tension spring 11 is correspondingly compressed.

Referring now to FIG. 2C, the roll 4 is then moved away from the hose 2 by the working cylinder 6. This eliminates compression of the filler material 8 then inside the hose 2 in the vicinity of the roll 5. Movement of roll 4 away from the hose 2 has the effect of a siphon on the filler material 8. As a result, filler material present in the discharge nozzle 9 recedes from the mouth of the nozzle into its interior as a result of the compression equalization developed at the end of the hose 2, so that the potential for dripping is eliminated. As a result, the prescribed amount of filler material is introduced into the cell cup with great precision.

Lastly, referring to FIG. 2D, the roll 5 is then returned to its pressure position, closing off the hose and preventing the afterflow of filler material (from above). While the roll 5 is kept in its closing position, roll 4 is returned to its initial operating position by the working cylinder 7 (to stop a), away from the hose 2. The next operating cycle begins when the working cylinder 6 once again operates to press roll 4 against the hose 2, initiating the above-described procedure.

In addition to the above-noted advantages, it is particularly important to note that the filler material does not come into contact with moving parts of the pump, which can result in separation of the liquid from the gel or viscous paste. The metering pump of the present invention also has other advantages. For example, to a certain extent, the hose is the only part subject to wear, and is easily replaced. The design of the device is simple, keeping costs low. The suction stroke, which is unavoidable in operating piston pumps, is virtually eliminated and coincides with the metering step because the roll 4 moving from stop a to stop b (in the pressure position) draws new material at the same time that the hose contents to be metered are being squeezed out. In this way, it is possible to achieve high metering speeds (on the order of at least 40 operating cycles per minute for round cells of a size of $14 \times 50$ mm). Finally, the greater reliability of the device allows improved utilization of the production plant.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for introducing viscous active ingredients into a case of a galvanic cell, by extrusion, comprising:

a nozzle for feeding the ingredients; and means for pumping the ingredients to the nozzle including an elastic, substantially straight section of hose, a first pressure roll movable along the hose between first and second limits, in the general direction of the nozzle, and for compressing the hose, and in an opposite direction for assuming a retracted position, means for moving the first pressure roll only in directions perpendicular to the hose and parallel to the hose, and means for compressing the section of hose at a point immediately adjacent to the segment defined between the first and second limits.

2. The apparatus of claim 1 wherein the means for compressing the section of hose at the point adjacent to the defined segment is a second pressure roll.

3. The apparatus of claim 2 wherein the second pressure roll is mounted within a head for movements perpendicular to the hose.

4. The apparatus of claim 3 wherein the second pressure roll is biased toward the hose by a tensioning spring.

5. The apparatus of claim 3 wherein the second pressure roll is movable toward and away from the hose responsive to a piston drive.

6. The apparatus of claim 1 wherein the first pressure roll is mounted to first and second working cylinders, the first working cylinder having means for moving the first pressure roll perpendicular to the hose, and the second working cylinder having means for moving the first pressure roll parallel to the hose.

7. The apparatus of claim 1 and a viscous active ingredient contained within the hose of the pumping means.

8. A method for introducing viscous active ingredients into a case of a galvanic cell, comprising the steps of:

delivering the ingredients to an elastic, substantially straight section of hose; and pumping the ingredients from the section of hose to a nozzle for delivering the ingredients to the case of the galvanic cell by selectively operating a first pressure roll movable only in directions perpendicular to the hose and parallel to the hose, and along the section of hose between first and second limits, in the general direction of the nozzle, and for compressing the hose, and in an opposite direction for assuming a retracted position, and by selectively compressing the section of hose at a point immediately adjacent to the segment defined between the first and second limits.

9. The method of claim 8 wherein said pumping includes the steps of:

advancing the first pressure roll into compression against the hose, at the first limit; and advancing the first pressure roll along the hose, to the second limit.

10. The method of claim 9 wherein said pumping includes the steps of:

releasing the section of hose at the point immediately adjacent to the defined segment when advancing the first pressure roll along the hose; and thereafter, compressing the section of hose at the point immediately adjacent to the defined segment.

11. The method of claim 9 which further comprises the steps of:

withdrawing the first pressure roll from compression with the hose, developing a siphon effect at the nozzle; and withdrawing the first pressure roll to the retracted position.

* * * * *